United States Patent
Holloway

(10) Patent No.: US 7,969,579 B2
(45) Date of Patent: Jun. 28, 2011

(54) ROTARY ENCODER APPARATUS

(75) Inventor: Alan James Holloway, Wotton-under-Edge (GB)

(73) Assignee: Renishaw plc, Wotton-under-Edge (GB)

( * ) Notice: Subject to any disclaimer, the term of this patent is extended or adjusted under 35 U.S.C. 154(b) by 226 days.

(21) Appl. No.: 12/226,972

(22) PCT Filed: Apr. 25, 2007

(86) PCT No.: PCT/GB2007/001511
§ 371 (c)(1),
(2), (4) Date: Nov. 3, 2008

(87) PCT Pub. No.: WO2007/129022
PCT Pub. Date: Nov. 15, 2007

(65) Prior Publication Data
US 2009/0180125 A1   Jul. 16, 2009

(30) Foreign Application Priority Data

May 4, 2006   (GB) .................................. 0608812.4

(51) Int. Cl.
*G01B 11/02*   (2006.01)
(52) U.S. Cl. ....................................................... 356/499
(58) Field of Classification Search .................. 356/499; 360/77.03
See application file for complete search history.

(56) References Cited

U.S. PATENT DOCUMENTS

| 5,671,052 A | 9/1997 | Kawakubo et al. |
| 5,861,953 A | 1/1999 | Henshaw |
| 5,886,352 A | 3/1999 | Wright et al. |
| 6,635,863 B1 | 10/2003 | Nihommori et al. |

FOREIGN PATENT DOCUMENTS

| EP | 0 439 804 A2 | 8/1991 |
| EP | 0 801 724 B1 | 1/2002 |
| GB | 2 186 362 A | 8/1987 |
| JP | A-9-14994 | 1/1997 |
| WO | WO 02/065061 | 8/2002 |
| WO | WO 2004/059346 A2 | 7/2004 |

OTHER PUBLICATIONS

Pettigrew; "Analysis of Grating Imaging and Its Application to Displacement Metrology;" *SPIE 1st European Congress on Optics Applied to Metrology*; 1977; vol. 136; pp. 325-331.

*Primary Examiner* — Tari Chowdhury
*Assistant Examiner* — Jonathon D Cook
(74) *Attorney, Agent, or Firm* — Oliff & Berridge, plc

(57) ABSTRACT

Rotary encoder apparatus is described that comprises one or more readheads and a radial scale. Each of the one or more readheads includes a light emitting portion for illuminating the radial scale and a light detecting portion for detecting interference fringes formed at a readhead analyzer plane. The readhead analyzer plane is tilted relative to the plane containing the radial scale. In a preferred embodiment, the readhead analyzer plane is tilted towards the center of rotation of the rotary encoder apparatus by the angle.

21 Claims, 3 Drawing Sheets

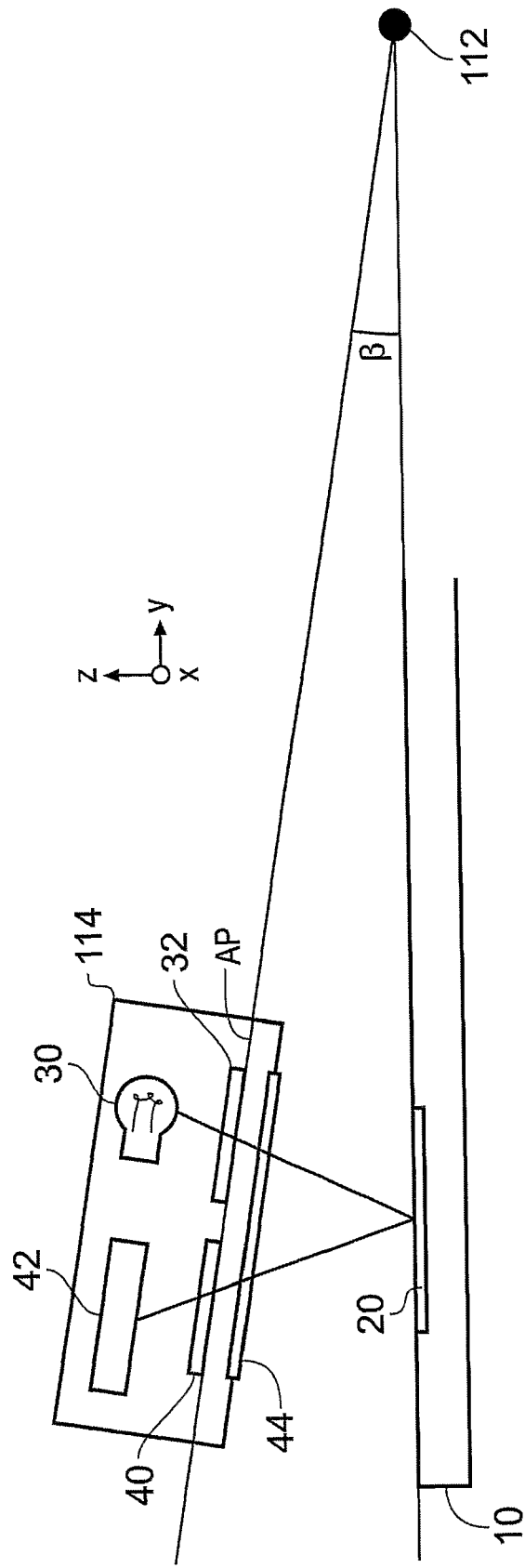

ROTARY ENCODER APPARATUS

The present invention relates to rotary encoder apparatus. In particular, the invention relates to the alignment of one or more readheads relative to the radial scale of a rotary encoder.

Rotary encoders comprising radial scales are known; for example, see U.S. Pat. No. 5,886,352 and WO02/065061. In such apparatus, a code wheel is provided that is rotatable relative to one or more readheads. The code wheel has a radial scale which comprises a series of radially extending, circumferentially spaced, lines marked at equidistant angles about its periphery. As shown in FIG. 2 of U.S. Pat. No. 5,886,352, the readhead of the rotary encoder is mounted so as to be parallel to, and maintain a certain fixed distance from, the radial scale of the code wheel.

The one or more optical readheads of such a rotary encoder each have a light emitting portion and a light detecting portion. The light emitting portion comprises an index grating and a light source (e.g. an LED) and is arranged to project a periodic light pattern on to the radial scale. The encoder is also arranged such that light reflected from the scale causes an interference (fringe) pattern to be formed at an analyser plane of the light detecting portion of the readhead.

The light detecting portion comprises a structured detector (often termed an electro-grating) that is arranged to have a series of light sensitive and non-sensitive regions (e.g. a series of interdigitated light sensitive fingers). The light detecting portion may also include an analyser grating disposed between the scale and the structured detector which is arranged to convert the fringes formed thereat into so-called Vernier fringes that have a greater spatial period. Any tangential movement between the readhead and the scale gratings causes the fringe pattern (including, where appropriate, the Vernier fringe pattern) to move along the light detecting portion. A sinusoidal signal can then be generated from the structured detector from which an incremental count can be derived which is indicative of any relative movement between the readhead and the scale.

According to a first aspect of the invention, rotary encoder apparatus comprises one or more readheads and a radial scale, each of the one or more readheads comprising a light emitting portion for illuminating the radial scale and a light detecting portion for detecting interference fringes formed at a readhead analyser plane, characterised in that said readhead analyser plane is tilted relative to the plane containing the radial scale.

Rotary encoder apparatus of the present invention thus includes one or more readheads that are rotatable relative to a radial scale. The radial scale comprises a series of circumferentially spaced scale markings which may be marked on the plane face of a rotary disk or ring. Each readhead comprises a light emitting portion that preferably illuminates the radial scale with a pattern of periodic light which may be generated, for example, using an index grating or the like as described below. In use, the radial scale diffracts the light it receives from the light emitting portion thereby producing an interference pattern. Each readhead also comprises a light detecting portion that is arranged to detect interference fringes which are formed at its associated readhead analyser plane. The readhead analyser plane of each readhead preferably has a fixed spatial relationship relative to that readhead.

In accordance with the present invention, the readhead analyser plane of each readhead is tilted relative to the plane containing the radial scale. In other words, the light detecting portion of each readhead is arranged to detect interference fringes that are formed in a readhead analyser plane that is tilted relative to the associated radial scale. Tilt of the readhead analyser plane may be achieved by, for example, tilting each readhead relative to the radial scale. The one or more readheads may be rotatable relative to the radial scale about a centre of rotation, wherein the readhead analyser plane of each readhead is advantageously tilted towards the centre of rotation. In such a case, the readhead analyser plane of each readhead is preferably tilted so as to, at least approximately, intersect said centre of rotation.

Tilting the readhead in this manner allows a fringe pattern to be generated at the readhead analyser plane comprising a series of radial interference lines which more closely correspond to the radial form of the radial scale. When using a non-collimated light source, this allows improved correlation to be achieved between the interference fringes that are generated and the structured detector or analyser grating that is located at the readhead analyser plane. The improved correlation arising from tilting the readhead analyser plane has been found to more than double the signal strength of the resulting detected signal compared with prior art devices having an analyser plane that is arranged to be substantially parallel to the radial scale. Providing such an increased signal level enables the interpolated incremental position of the readhead relative to the radial scale to be determined with a higher degree of accuracy. For example, doubling the detected signal strength will typically double the angular resolution that can be obtained from the encoder apparatus.

The improvement in performance that is obtained by tilting the readhead analyser plane of each readhead in accordance with the present invention thus provides improved performance compared with rotary encoders of the type described in U.S. Pat. No. 5,886,352 in which each readhead (and its associated readhead analyser plane) are orientated so as to be maintained substantially parallel to the plane of the radial scale. The physics underlying the improvements associated with providing a readhead analyser plane that is tilted with respect to the associated radial scale are explained in more detail below.

Advantageously, the light detecting portion of each of said one or more readheads comprises an analyser grating located in the readhead analyser plane. Conveniently, the analyser grating has an angular pitch that is close, but preferably not identical, to the pitch of the fringes from the radial scale that are formed at the readhead analyser plane. Advantageously, the analyser grating is an amplitude grating. Examples of suitable analyser gratings are described in U.S. Pat. No. 5,886,352; in particular, see columns 3 through 7.

If an analyser grating is provided in the readhead analyser plane, the light detecting portion of each of said one or more readheads may advantageously comprise a structured light detector (which may also be termed an electro-grating) that is arranged to receive light from said analyser grating. Light may be transmitted through, or reflected from, the analyser grating to the structured light detector as required.

In such an arrangement, a set of so-called Vernier fringes will be formed at the structured detector that move along the detector as the scale rotates about its axis. The structured light detector may comprise a series of inter-digitated light sensitive fingers. These fingers may be arranged to match the form of the incident Vernier fringes and sub-divided so as to generate three or more sinusoidally varying electrical output signals as the Vernier fringes move across the structured detector. The electrical output signals may then be interpolated in a standard manner to provide a measure of relative movement between the readhead and the radial scale with a high angular resolution. In this manner, a so-called incremental encoder can be formed.

It should be noted that providing an analyser grating of the type described above is advantageous but by no means essential. As explained previously in U.S. Pat. No. 5,886,352 and outlined below, the analyser grating is provided to convert the first set of interference fringes formed at the readhead analyser plane into a second set of interference fringes at the structured detector. The analyser grating is arranged such that the second set of interference fringes have a larger spatial period than the first set of fringes, thereby allowing the size of the structured fingers of the light detector to be increased. Providing an analyser grating thus increases the required size of the structured detector thereby reducing the cost and complexity of such a detector. However, a structured light detector may be located directly in the readhead analyser plane if desired.

Advantageously, the light emitting portion of each of the one or more readheads comprises an index grating. The index grating may be a phase grating or an amplitude grating as required. Such an index grating may be used, with an associated light source of the type described in more detail below, to provide a structured light pattern which illuminates the radial scale. Light may pass to the radial scale by reflection from, or transmission through, the index grating. Although advantageous, the skilled person would appreciate that the provision of an index grating within each readhead is by no means essential to provide an operable apparatus.

Advantageously, the index grating is tilted relative to the plane containing the radial scale. The amount of tilt may be the same as, or different to, the tilt of the readhead analyser plane and will depend on the geometry of the optical arrangement.

For apparatus comprising a reflective radial scale, the index grating is preferably arranged to lie in the readhead analyser plane. In other words, the index grating may lie in a plane which is coincident with the readhead analyser plane of the light detecting portion. In a preferred embodiment, the index grating may be formed on the same substrate as the analyser grating of the light detecting portion. In other words, each readhead may comprise a single, common, substrate (e.g. a piece of glass) having both an analyser grating and an index grating formed thereon. The index grating may be located at a greater or lesser radial distance than any analyser grating. In such an arrangement, the index grating will thus be tilted relative to the radial scale by the same angle as the readhead analyser plane.

In a reflective geometry of the type described above, the perpendicular distance from the scale to the readhead analyser plane (v) will, at a given radius, typically equal the perpendicular distance from the radial scale to the index grating (u). However, it should be noted that it is also possible to provide a reflective geometry in which u does not equal v.

As an alternative to an apparatus having a reflective radial scale, a transmissive radial scale may advantageously be provided. Light may thus advantageously be passed from the light emitting portion to the light detecting portion by transmission through the radial scale. In such a transmissive arrangement, the light detecting and light emitting portions may be located at different sides of the radial scale. In such a case, the index grating is preferably tilted in the opposite (or negative) direction relative to the radial scale than the readhead analyser plane. In such a transmissive geometry, u may equal or differ from v depending on the placement of the light emitting and detecting portions.

The index grating is preferably a radial grating. As would be appreciated by person skilled in the art, a radial grating comprises a series of pitch lines which are aligned such that they would intersect at a centre point and are each separated by a certain (single) angle. A radial grating thus has a radial pitch; i.e. a pitch which varies as a function of the radial distance from the central intersection point. The relative values of the perpendicular distances from the scale u and v determine, for both reflective and transmissive radial scales, the required radial pitch of the radial index grating. If u equals v, the index grating preferably has a radial pitch substantially equal to the radial pitch of the series of circumferentially spaced scale markings of the radial scale. For a transmissive radial scale arrangement in which u equals v, the tilt of the readhead analyser plane is also preferably equal and opposite to the tilt of the index grating. If u differs from v, the radial pitches of the radial scale and the index grating may be scaled accordingly.

Although providing a light emitting portion having an index grating is preferred, it should be noted that it is by no means essential. The light emitting portion may advantageously comprise any arrangement that is suitable for projecting light or a structured light pattern onto the radial scale. For example, the light emitting portion may comprise an array (e.g. a linear array) of point sources, a micro-lens array etc.

Conveniently, the light emitting portion of each of the one or more readheads comprises a light source. For example, each readhead may comprise an LED. Advantageously, the light source comprises an infrared light emitting diode (IRED).

The light source need not be collimated or monochromatic and may be arranged to illuminate an associated index grating of the type described above. The apparatus of the present invention thus has the additional advantage that the light emitting portion may comprise a relatively low cost and simple non-collimated and/or polychromatic light source, such as an IRED, and does not require a source of tightly controlled collimation (e.g. a laser having appropriate collimating optics).

Advantageously, the radial scale is arranged to rotate about its centre relative to a stationary index grating that is mounted within the light emitting portion of the readhead. The skilled person would also recognise that an equally valid rotation dependent fringe movement could be achieved by rotating the index grating about its centre relative to a stationary scale grating mounted within the readhead. The advantage of such a scheme would be to limit the size and cost of the phase scale within the apparatus.

Conveniently, each readhead comprises a readhead housing to contain the light emitting portion and/or the light detecting portion. The readhead housing may comprise a first outer surface that conveniently includes a substantially transparent window portion through which the light emitted by the light emitting portion, and/or detected by the light detecting portion, passes.

Advantageously, the readhead analyser plane is tilted relative to the first outer surface of the readhead housing. For example, the analyser grating may be mounted so that it is tilted relative to the first outer surface of the readhead housing. In such apparatus, the first outer surface may be substantially flat and lie in a plane that is substantially parallel to the plane containing the radial scale.

If a reflective radial scale is provided, the light emitting portion and the light detecting portion of each readhead may advantageously be contained in a common readhead housing. In such an arrangement, the readhead may comprise an index grating and an analyser grating that are carried by, or formed on, a common substrate.

This common substrate may be tilted relative to the outer surface of the readhead housing.

Although it is preferred to tilt the analyser plane relative to the outer surface of the readhead, it should be noted that the readhead analyser plane may be arranged to be substantially parallel to an outer surface of the readhead housing. In such an arrangement, the readhead housing itself may be tilted relative to the plane containing the radial scale.

Advantageously, the radial scale is a phase scale. Alternatively, the radial scale may be an amplitude scale. Such an amplitude scale may comprise a series of light transmissive and opaque lines (for transmission based apparatus) and/or a series of reflective and non-reflective lines (for reflection based apparatus). The radial scale may comprise scale marking having a tangential separation as small as 2 μm and may be of any required radius. For example, the radial scale may have a radius less then 50 mm, less than 30 mm or less than 10 mm.

As noted above, the analyser grating is preferably an amplitude grating whereas the index grating may be a phase or amplitude grating. Conveniently, the radial scale is a phase scale and the analyser and index gratings are amplitude gratings.

Advantageously, the apparatus comprises a plurality of readheads. For example, a pair of readheads may be located at diametrically opposed locations about the radial scale. The apparatus may also be arranged to blend the incremental counts provided by the readheads to provide a combined incremental count which is resistant to any eccentricity errors. Blending incremental counts in such a manner is known to those skilled in the art of multiple readhead encoder apparatus.

Rotary encoder apparatus of the type described above can be used in many different applications. For example, a co-ordinate measurement device may comprise such rotary encoder apparatus. In particular, such a rotary encoder may be advantageously included in a rotary stage for a co-ordinate measurement machine (CMM).

According to a second aspect of the invention, a method of making a rotary encoder comprises the steps of; (i) taking a radial scale having a series of circumferentially spaced scale markings, (ii) taking one or more readheads that each comprise a light emitting portion for illuminating a radial scale and a light detecting portion for detecting interference fringes formed at a readhead analyser plane; and (iii) mounting each of the one or more readheads such that the light emitting portion thereof illuminates said radial scale and generates interference fringes at said readhead analyser plane, characterised in that step (iii) comprises the step of mounting at least one readhead so that, during use, the readhead analyser plane is tilted relative to the plane containing the radial scale. Advantageously, step (iii) comprises mounting each of the one or more readheads such that said readhead is tilted relative to plane containing the radial scale.

It should be noted that the term "light" as used herein encompasses both visible and non-visible optical radiation and thus includes radiation having a wavelength from the deep ultra-violet to the far infra-red.

The invention will now be described, by way of example only, with reference to the accompanying drawings in which;

FIG. 5 shows encoder apparatus of the present invention that comprises a tilted readhead.

Figure 1:
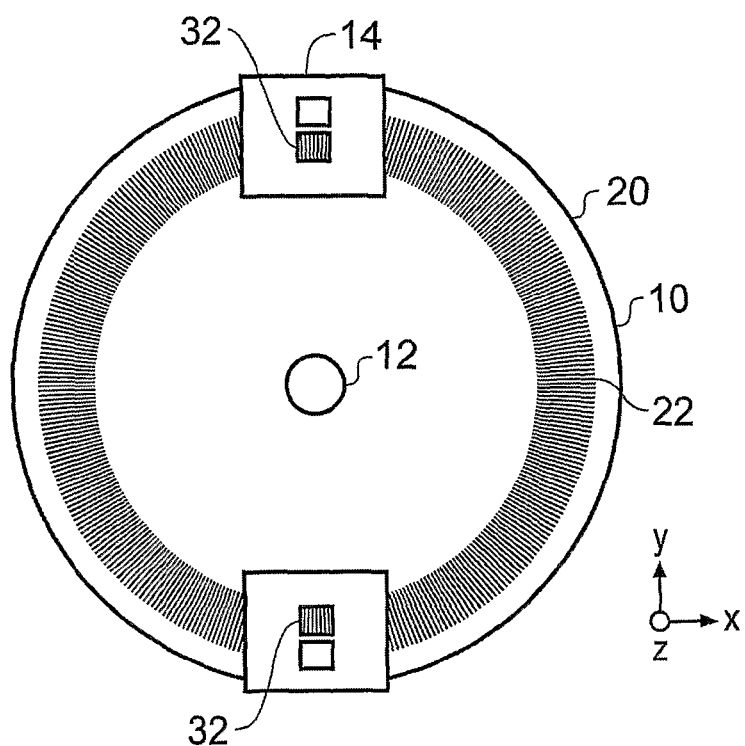
FIG. 1 illustrates prior art rotary encoder apparatus.
Figure 2:
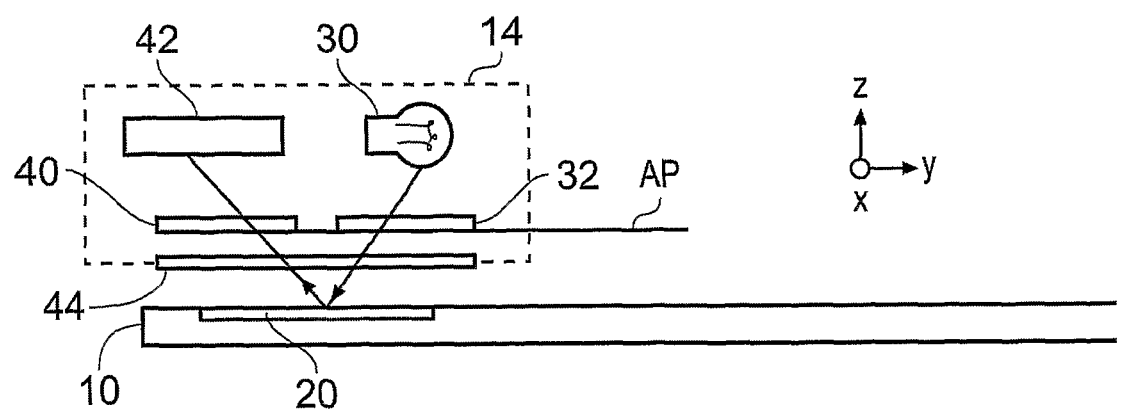
FIG. 2 shows an optical readhead of the prior art apparatus of FIG. 1 in more detail.

Referring to FIGS. 1 and 2, prior art rotary encoder apparatus of the type described in U.S. Pat. No. 5,886,352 is illustrated.

As shown in FIG. 1, the encoder apparatus comprises a circular code wheel 10 that has, around its periphery on the plane face of the code wheel, a radial scale 20 that is made up of a series of alternately light reflecting and non-reflecting lines 22. The lines 22 extend radially and are circumferentially spaced apart from each other. Although the radial scale 20 is an amplitude scale, a phase grating structure could alternatively be provided. A pair of readheads 14 are located adjacent the scale. The readheads 14 are arranged to be rotatable relative to the rotary scale 20 about a central bearing 12.

Referring to FIG. 2, a readhead 14 of the apparatus described with reference to FIG. 1 is shown in more detail. The readhead 14 includes a diffuse light source 30, an index grating 32, an analyser grating 40, a detector 42 and an optically transparent readhead window 44.

The diffuse light source 30 illuminates the scale 20 via an index grating 32. The index grating 32 comprises alternate light transmitting and opaque lines (not shown) having a substantially identical geometry to the lines 22 of the scale 20. After passing through the index grating 32, light is reflected from the scale 20 and forms a series of interference fringes (i.e. a periodic fringe pattern) at the analyser grating 40. The periodic structures of the index grating 32 and scale 20, together with the stand-off distance between the grating 32 and the scale 20, are chosen so that the interference fringes formed at the analyser grating 40 have the same geometry as the lines of the index grating 32 and scale 20.

The analyser grating 40 has a period which is slightly different than the period of the interference fringes. The interference fringes are thus converted into so-called Vernier fringes by the analyser grating 40. The Vernier fringes, which have a longer period than the interference fringes from which they were formed, are passed to a structured detector 42 which is often termed an electro-grating. The structured detector 42 comprises a semiconductor substrate upon which a series of photosensitive elements are formed. The photosensitive elements extend radially with respect to the code wheel and are grouped into at least three sets, with all elements of a given set being electrically connected in common. The photosensitive elements are interleaved in a repeating pattern, and are angularly spaced such that consecutive like elements are separated by an angle substantially equal to the pitch of a resultant Vernier fringe.

In use, rotation of the code wheel 10 relative to the readheads 14 causes movement of the interference fringes formed at the analyser grating 40 (i.e. in the readhead analyser plane AP). There is thus a cyclically varying modulation of the intensity of light incident upon any given point in the readhead analyser plane. Movement of the interference fringe pattern relative to the analyser grating 40 (e.g. upon rotation of the wheel 10) by an angular displacement equal to one interference fringe pitch, will result in a corresponding shift of the resultant Vernier fringe by one resultant fringe pitch.

As the resultant Vernier fringes move across the structured detector 42, each set of photosensitive elements will generate a sinusoidally varying electrical output; the outputs of the three sets of elements having a phase relationship of 0°, 120° and 240° respectively. These signal may then be combined in a known manner, to produce a pair of sinusoidally varying quadrature outputs from which the magnitude and direction of rotation of the code wheel can be determined.

It should be noted that an analyser grating is used simply to provide Vernier fringes that have a longer pitch than the interference fringes. This allows the dimensions of the detector elements to be increased, thereby reducing the cost and complexity of the detector arrangement. It can be shown that the shift of the resultant Vernier fringes has a one-to-one relationship with the shift of the interference fringes and it is thus valid to observe the light intensity modulation occurring downbeam of the analyser grating from the shift of the resultant Vernier fringe as a method of determining the angular displacement of the code wheel. It should be noted that if a suitably structured detector was provided, the analyser grating could be omitted from the apparatus.

A more detailed description of the apparatus described with reference to FIGS. 1 and 2 can be found in U.S. Pat. No. 5,886,352, the contents of which are incorporated herein by reference. In particular, columns 2 and 3 of U.S. Pat. No. 5,886,352 describe the layout of a radial scale encoder and columns 3 to 4 of U.S. Pat. No. 5,886,352 describe the detector structure.

The present inventors have now found that the prior art arrangement described with reference to FIGS. 1 and 2 can be improved by tilting the readheads 14 towards the centre of rotation of the radial scale.

Figure 3:
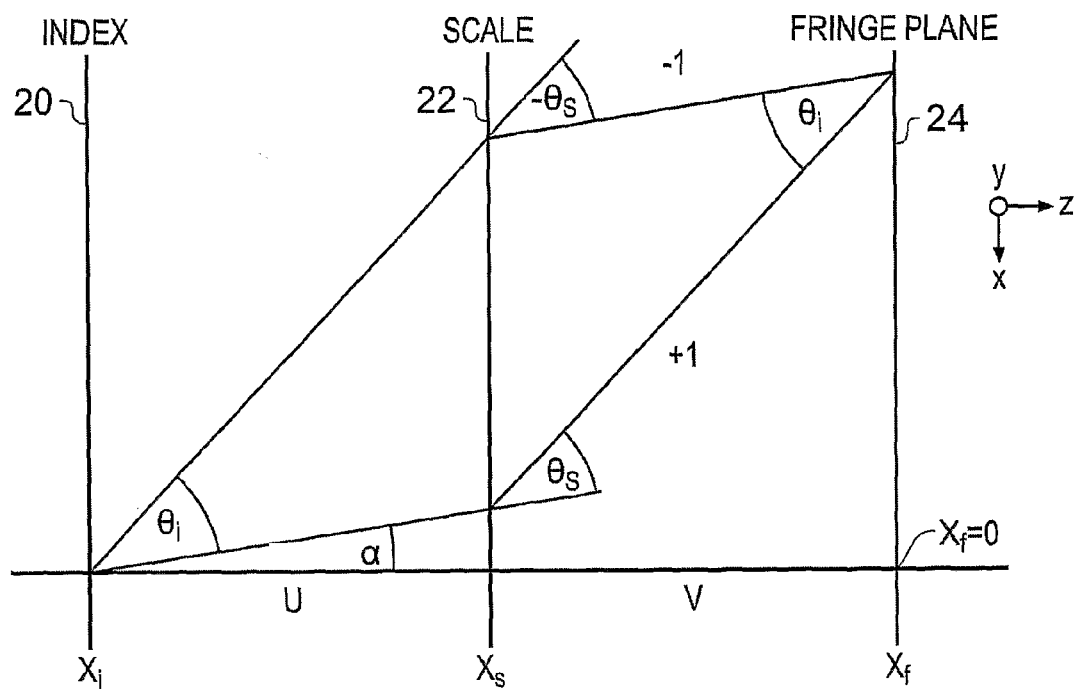
FIG. 3 illustrates the optical properties of a radial scale encoder by following the key diffractive orders.

Referring to FIG. 3, consider the x-z plane geometry of the system. As illustrated, the optical system comprises an index grating 20, a scale grating 22 and a fringe plane 24. From a region on the index grating, two key diffracted order paths having an angular separation of $\theta_i$, are also plotted.

It has been shown previously (see Pettigrew R. M., Proc. Soc. Photo-Opt. Instrum. Eng. 136, p 325 (1977)) that:

$$P_i = \frac{P_s}{2}\left(1 + \frac{u}{v}\right) \quad (1)$$

and $$P_i = \frac{u}{v} P_f \quad (2)$$

where $P_i$ is the spatial period of the index grating 20, $P_s$ is the spatial period of the scale grating 22, $P_f$ is the spatial period of the fringes formed at the fringe plane 24, u is the separation between the index grating 20 and the scale plane 22 and v is the separation between the scale plane 22 and the fringe plane 24.

Figure 4:
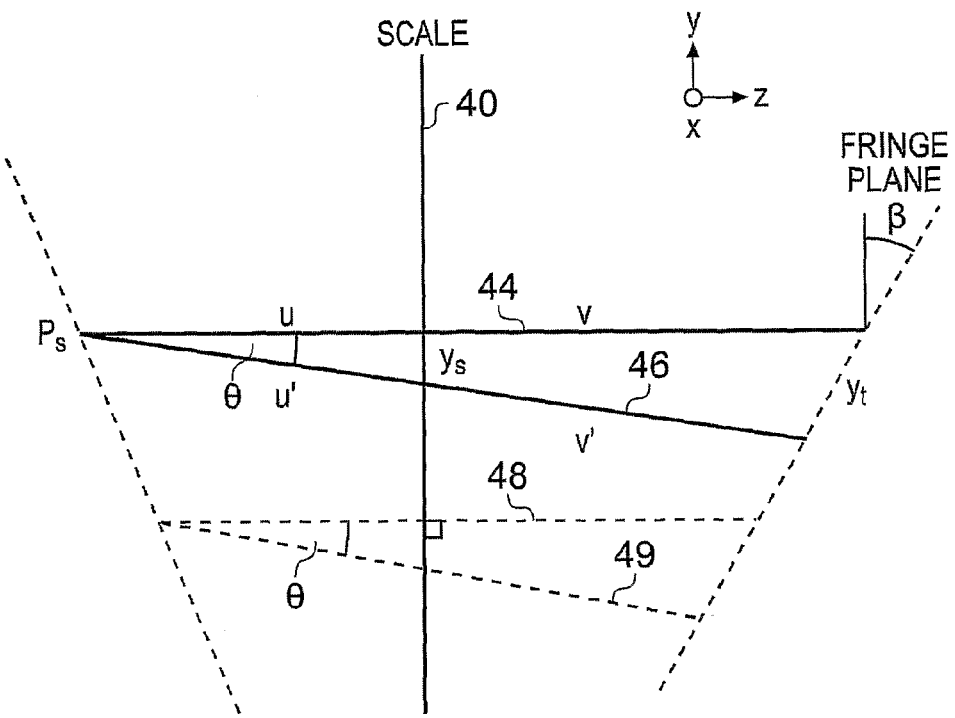
FIG. 4 illustrates the optimal fringe plane for a radial scale encoder.

Referring now to FIG. 4, the orientation of the optimal fringe plane 42 in the y-z plane for a radial scale 40 will be described. In particular, FIG. 4 illustrates a linear array of points $P_o$ (i.e. points extending along the x-axis and hence into the page) that illuminate (as shown by rays 44 and 46) a radial scale grating 40 having a spatial period $P_s$. The spacing of the points $P_o$ at the index grating and the spatial period of the scale grating are interrelated by the expression:

$$P_s = P_o\left(1 + \frac{Y_s}{R_s}\right) \quad (3)$$

where $R_s$ is the radius of the scale for ray 44 and $R_s$-$Y_s$ is the radius of the scale at the intersection point for ray 46. This assumption is valid for achromatic fringes. As outlined above, the index grating pitch ($P_i$) required to produce achromatic fringes is given by equation (1).

As an example of a simple analysis of the geometry shown in FIG. 4, consider the separation between the index and scale grating matches the separation between the scale and fringe plane (i.e. that u equals v). Also, for small angles, the separation between the two rays at the fringe plane can be approximated as twice the separation of those rays at the scale plane (i.e. $y_f$ is approximately twice $y_s$). Furthermore, it can be assumed that the path difference between the two rays passing from the scale to the fringe is given by $\Delta v$.

Using the above approximations in combination with equations (1) and (3), it can be shown that;

$$v' \approx \left(\frac{R_s + Y_s}{R_s - Y_s}\right)u \quad (4)$$

and hence that;

$$\frac{dv}{dy_f} \approx \frac{u}{R_s} \approx \frac{v}{R_s} \quad (5)$$

From equation (5) it can be seen that the fringe plane tilts (at least approximately) towards the scale centre. This has been found to be a good approximation for the angles of interest.

From equations (2) and (4), it can also be shown that;

$$\frac{dP_f}{dy_f} \approx \frac{P_o}{R_s} \quad (6)$$

Hence, it can be seen that the fringes formed on the tilted plane are radial with the same centre as the scale.

Imagine now a second u, v line at a slightly different radius on the scale where the index and scale again have the same pitch. Keeping v as the normal distance from the scale 22 to the fringe plane 24, and u equal to v, the maths outlined above can be applied again exactly and the new point sources would reinforce the current fringes. This is shown as dashed lines 48 and 49 in FIG. 4.

It can therefore be seen that to produce good fringe visibility from a reflective radial scale, the index grating and the detector plane coincide. Also, at a given radius $R_s$, the index grating preferably comprises a radial grating having the same spacing as the scale grating at normal incidence. In such a case, the grating plane should be tilted towards the centre of the scale to provide the optimum fringe visibility for a non-collimated source.

Referring now to FIG. 5, a rotary encoder having a tilted readhead 114 in accordance with the above teachings is illustrated.

The readhead 114 comprises components analogous to those in prior art readheads 14 of the type described with reference to FIG. 1. However, the readhead 114 is tilted by an angle ($\beta$) relative to the rotary scale 20 such that the readhead analyser plane (AP) approximately intersects the centre of rotation 112 of the rotary scale 20.

It should be remembered that the readhead comprises a glass window 44. The effect of such a window, which has a higher refractive index than air, is to very slightly alter the amount of readhead tilt that is required for optimum performance. However, the effect of such a window is typically minimal and can, to a good approximation, be ignored. If desired, optical modelling could be performed to account for the window when calculating the optimum tilt.

The above described arrangement thus ensures that the optimum (or a very close to optimum) fringe pattern is passed to the detector 42 thereby maximising the positional accuracy attainable from the rotary encoder.

Although a tilted readhead is shown in FIG. 5, it should be re-emphasised that the analyser plane may actually be tilted relative to the outer surface of the readhead housing. In such a case, the readhead housing could be more easily aligned with the associated radial scale.

The invention claimed is:

1. A rotary encoder apparatus comprising:
   a radial scale,
   one or more readheads, each of the one or more readheads comprising:
      a light emitting portion for illuminating the radial scale, and
      a light detecting portion for detecting interference fringes formed at a readhead analyzer plane, wherein:
   said readhead analyzer plane is tilted relative to a plane containing the radial scale,
   the one or more readheads are rotatable relative to the radial scale about a center of rotation, and
   the readhead analyzer plane of each of the one or more readheads is tilted towards the center of rotation.

2. The apparatus according to claim 1, wherein the readhead analyzer plane of each of the one or more readheads is tilted so as to substantially intersect said center of rotation.

3. The apparatus according to claim 1, wherein the light detecting portion of each of said one or more readheads comprises an analyzer grating in the readhead analyzer plane.

4. The apparatus according to claim 3, wherein the analyzer grating has an angular pitch that is close, but not identical, to the interference fringes formed at the readhead analyzer plane.

5. The apparatus according to claim 3, wherein the light detecting portion comprises a structured light detector arranged to receive light from said analyzer grating.

6. The apparatus according to claim 1, wherein the light emitting portion of each of the one or more readheads comprises a index grating.

7. The apparatus according to claim 6, wherein the index grating is tilted relative to the plane containing the radial scale.

8. The apparatus according to claim 6, wherein a perpendicular distance between the radial scale and the readhead analyzer plane is substantially equal to a perpendicular distance between the radial scale and the index grating.

9. The apparatus according to claim 8, wherein the index grating of each of the one or more readheads lies in the readhead analyzer plane.

10. The apparatus according to claim 8, wherein the index grating has a radial pitch substantially equal to a radial pitch of the series of circumferentially spaced scale markings of the radial scale.

11. The apparatus according to claim 1, wherein the light emitting portion of each of the one or more readheads comprises a light source.

12. The apparatus according to claim 11, wherein the light source is non-collimated.

13. The apparatus according to claim 11, wherein the light source comprises an infrared light emitting diode.

14. The apparatus according to claim 1, wherein each of the one or more readheads comprises a readhead housing to contain said light detecting portion, and the readhead analyzer plane is tilted relative to a first outer surface of the readhead housing.

15. The apparatus according to claim 14, wherein the first outer surface of the readhead housing comprises a substantially transparent window portion.

16. The apparatus according to claim 1, wherein the radial scale is a reflective radial scale.

17. The apparatus according to claim 1, wherein the radial scale is a transmissive radial scale.

18. The apparatus according to claim 1, wherein the radial scale is a phase scale.

19. The apparatus according to claim 1, comprising a plurality of readheads.

20. A co-ordinate measurement device comprising the rotary encoder apparatus according to claim 1.

21. A method of making a rotary encoder comprising the steps of:
   (i) taking a radial scale having a series of circumferentially spaced scale markings,
   (ii) taking one or more readheads that each comprise a light emitting portion for illuminating a radial scale and a light detecting portion for detecting interference fringes formed at a readhead analyzer plane; and
   (iii) mounting each of the one or more readheads such that the light emitting portion thereof illuminates said radial scale and generates interference fringes at said readhead analyzer plane, wherein:
   step (iii) comprises the step of mounting at least one readhead so that, during use, the readhead analyzer plane is tilted relative to a plane containing the radial scale, and
   step (iii) comprises mounting each of the one or more readheads such that said readhead is tilted relative to the plane containing the radial scale.

* * * * *